United States Patent
Talius et al.

(10) Patent No.: US 8,527,462 B1
(45) Date of Patent: Sep. 3, 2013

(54) DATABASE POINT-IN-TIME RESTORE AND AS-OF QUERY

(75) Inventors: Tomas Talius, Sammamish, WA (US); Robin Dhananjay Dhamankar, Bellevue, WA (US); Hanumantha R. Kodavalla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 65 days.

(21) Appl. No.: 13/370,125

(22) Filed: Feb. 9, 2012

(51) Int. Cl.
*G06F 17/30* (2006.01)

(52) U.S. Cl.
USPC ............................ 707/639; 707/682; 707/684

(58) Field of Classification Search
None
See application file for complete search history.

(56) References Cited

U.S. PATENT DOCUMENTS

| | | | |
|---|---|---|---|
| 2004/0220961 A1* | 11/2004 | Lee et al. ...................... | 707/102 |
| 2004/0267835 A1* | 12/2004 | Zwilling et al. ............... | 707/202 |
| 2005/0246487 A1 | 11/2005 | Ergan et al. | |
| 2005/0256907 A1 | 11/2005 | Novik et al. | |
| 2005/0262378 A1 | 11/2005 | Sleeman et al. | |
| 2005/0278394 A1 | 12/2005 | Oks et al. | |
| 2006/0190469 A1 | 8/2006 | Kathuria et al. | |
| 2006/0190572 A1 | 8/2006 | Novik et al. | |
| 2006/0206544 A1 | 9/2006 | Oks et al. | |
| 2006/0224636 A1 | 10/2006 | Kathuria et al. | |
| 2006/0235907 A1 | 10/2006 | Kathuria et al. | |
| 2006/0235909 A1 | 10/2006 | Oks et al. | |
| 2006/0242443 A1 | 10/2006 | Talius et al. | |
| 2006/0265434 A1 | 11/2006 | Kathuria et al. | |
| 2007/0005664 A1 | 1/2007 | Kodavalla et al. | |
| 2007/0073764 A1* | 3/2007 | Oks et al. ...................... | 707/102 |
| 2007/0282914 A1 | 12/2007 | Sivapragasam et al. | |
| 2008/0034012 A1 | 2/2008 | Novik et al. | |
| 2008/0120470 A1 | 5/2008 | Dhamankar et al. | |
| 2009/0182746 A1 | 7/2009 | Mittal et al. | |
| 2009/0300013 A1 | 12/2009 | Kodavalla et al. | |
| 2009/0319582 A1* | 12/2009 | Simek et al. .................. | 707/204 |
| 2010/0036843 A1* | 2/2010 | MacNaughton et al. ......... | 707/8 |
| 2010/0077197 A1 | 3/2010 | Ergan et al. | |
| 2010/0241614 A1 | 9/2010 | Shaull et al. | |
| 2010/0257138 A1 | 10/2010 | Wang et al. | |

(Continued)

OTHER PUBLICATIONS

Oracle Database Advanced Application Developer's Guide [online], 11g Release 1 (11.1), Aug. 2008 [Retrieved on Jun. 5, 2013]; Retrieved from the Internet: <URL: http://docs.oracle.com/cd/B28359_01/appdev.111/b28424.pdf>.*

(Continued)

*Primary Examiner* — Neveen Abel Jalil
*Assistant Examiner* — Tyler Torgrimson
(74) *Attorney, Agent, or Firm* — Ogilvie Law Firm

(57) ABSTRACT

A database is queried as of any wall-clock time within a retention period, via undo that uses database snapshots and a list of page level modifications. The snapshot is user-identified, automatically generated, or extracted from a backup. The list is maintained in a transaction log by persisting page content before a page is re-used, persisting deleted rows before they are moved, persisting compensation log record undo information, and/or logging a full page. To rewind an entire database, the undo scans the transaction log in reverse LSN order and undoes all page modifications. Undo reverses reallocated pages, table truncation, and/or table deletion, as well as page-level modifications of a schema, metadata values, and/or system tables. An as-of query is handled using as-of page(s) from a sparse page file. If the sparse page file does not already contain the responsive page(s), they are created and added to it.

20 Claims, 3 Drawing Sheets

(56) References Cited

U.S. PATENT DOCUMENTS

| | | | |
|---|---|---|---|
| 2010/0312751 A1 | 12/2010 | Anglin et al. | |
| 2011/0004585 A1 | 1/2011 | Becker et al. | |
| 2011/0131185 A1 | 6/2011 | Kirshenbaum | |
| 2011/0145201 A1 | 6/2011 | Holst et al. | |
| 2011/0161295 A1* | 6/2011 | Ngo | 707/639 |
| 2011/0178984 A1 | 7/2011 | Talius et al. | |
| 2011/0179000 A1 | 7/2011 | Shaughnessy | |
| 2011/0179008 A1 | 7/2011 | Talius | |
| 2011/0191299 A1 | 8/2011 | Huynh Huu et al. | |
| 2011/0219020 A1 | 9/2011 | Oks et al. | |
| 2011/0225122 A1 | 9/2011 | Denuit et al. | |
| 2011/0251997 A1 | 10/2011 | Wang et al. | |
| 2012/0005422 A1 | 1/2012 | Ergan et al. | |

OTHER PUBLICATIONS

Chervenak, et al., "Protecting File Systems: A Survey of Backup Techniques", Retrieved at <<http://storageconference.org/1998/papers/a1-2-CHERVE.pdf>>, Joint NASA and IEEE Mass Storage Conference, Mar. 1998, pp. 17-31.

Vrable, et al., "Cumulus: Filesystem Backup to the Cloud", Retrieved at <<https://www.usenix.net/events/fast09/tech/full_papers/vrable/vrable.pdf>>, ACM Transactions on Storage (TOS), 2009, pp. 225-238.

Yang, et al., "Trap-Array: A Disk Array Architecture Providing Timely Recovery to Any", Retrieved at <<http://www.ele.uri.edu/Research/hpcl/2006/TRAP.pdf>>, ISCA: The 33rd Annual International Symposium on Computer Architecture, 2006, pp. 12.

* cited by examiner

DATABASE POINT-IN-TIME RESTORE AND AS-OF QUERY

BACKGROUND

In database systems, backups can be used for various purposes, such as recovery from hardware failure, disaster recovery, recovery from user error, and/or recovery from application error. In replicated cloud database and other database systems, redundant copies of data can provide local high availability, leading in some cases to frequent use of backups to recover from application or user error. But when large volumes of data are stored, with backups that include a base full backup and incremental transaction log backups for point in-time roll forward recovery, supporting such recovery from user or application errors can impose a high storage cost. Substantial time may also be spent recovering from an error by restoring the full backup and applying incremental backups, even to extract something as small as few rows that were deleted by either human or application error

SUMMARY

A database can be queried as of an arbitrary past time within a specified retention period, without unacceptable storage and processing costs. Some embodiments described herein provide access to a version of database content as it existed at a previous point in time, referred to as the "as-of time". Instead of (or in addition to) a roll-forward recovery mechanism, an undo mechanism can be applied to obtain the desired version of a database. The undo mechanism utilizes tracking of modifications at a page level, namely, at the level of pages being used as memory allocation units, as opposed to table level, row level, etc. Some embodiments utilize a transaction log for undo tracking and snapshots to surface the as-of query. In some, the as-of query is issued against a database snapshot which uses the undo mechanism to undo modifications tracked at page level. The additional storage for an as-of query can be bounded by the changes made during the retention period, and the computation to do point-in-time restore or as-of query can be bounded by the amount of data to be retrieved.

For example, some embodiments acquire a database snapshot based on a database. The database snapshot resides in and thus configures a computer-readable storage medium, such as RAM and/or disk storage. The snapshot may be an existing snapshot that is expressly identified by a database user, or a snapshot automatically generated internally by the mechanism, or snapshot data extracted from a differential backup of the database, for example.

In some embodiments, the undo mechanism computationally undoes modifications of database content which were made after the as-of time, in the context of the acquired snapshot at a page level within the storage medium, thereby producing an electronically accessible as-of snapshot which is a snapshot of the database as it existed at the as-of time. The as-of time may be specified as a wall clock time, which the mechanism maps to a transaction log record sequence number, namely, an as-of LSN. "LSN" stands for "log sequence number", which is also known as a transaction log record sequence number.

In some embodiments, undoing modifications at a page level includes traversing a list of page modifications that has been maintained in an enhanced log and/or in other file(s). A log that is enhanced to list page modifications may be an active transaction log of the database, or an inactive transaction log of a database backup, for example. A list that supports undoing page modifications may be maintained, for example, by persisting page content before a page is re-used, persisting deleted rows before they are moved to a newly allocated page during a structure modification operation, persisting compensation log record undo information, incrementally logging page content before a page is re-used, incrementally logging deleted rows before they are moved to a newly allocated page, incrementally logging compensation log record undo information, logging the full content of at least one page as an optimization, maintaining an uninterrupted sequence of page modifications in an enhanced transaction log with each modification logged separately, and/or performing incremental logging and additionally logging full page images to optimize undo operations, e.g., to reduce the number of individual modifications that must be undone. Some embodiments can rewind an entire database snapshot back to an as-of time by performing a single scan over an enhanced transaction log in reverse LSN order and undoing modifications to all the database pages. The transaction log is "enhanced" in some embodiments by the addition of information to support page-level undo, as discussed herein.

In some embodiments, undoing modifications at a page level includes undoing an operation on a reallocated page, undoing an operation which truncated a table, and/or undoing an operation which deleted a table. Some embodiments computationally undo page-level modifications of a schema, a metadata value, and/or a system table of the database which were made after the as-of time, using the acquired snapshot.

Some embodiments handle an as-of query, that is, a query whose response is based on the database content as it existed at the as-of time. An as-of query is handled using one or more pages from a sparse page file that contain information responsive to the query. The sparse page file of an as-of snapshot may already contain the responsive page(s), but if not, they are created and added to it. In some embodiments, the sparse page file is replaced by a side file or other equivalent mechanism, namely, one that caches the pages that were already prepared or otherwise have accurate content for as-of query response(s). Accordingly, in some situations handling an as-of query includes identifying a page which contains information responsive to the query, determining that the responsive page is present in a sparse page file, and responding to the as-of query using the page. In other situations, the responsive page(s) are created and added to the sparse page file. In those situations, handling an as-of query includes identifying a responsive page, determining that the responsive page is not yet present in the sparse page file, reading the page from the database as of the current point in time, undoing modifications of the page back to the as-of time to produce an as-of page, writing the as-of page to the sparse page file, and responding to the query using the as-of page.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
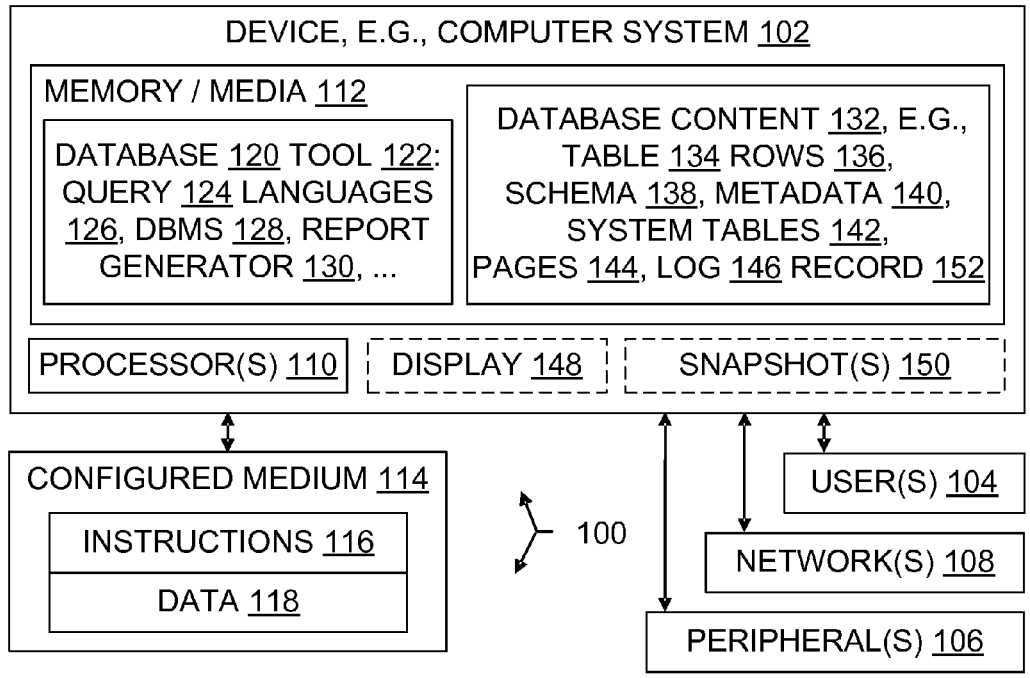
FIG. 1 is a block diagram illustrating a computer system having at least one processor, at least one memory, at least one database, and other items in an operating environment which may be present on multiple network nodes, and also illustrating configured storage medium embodiments.

In some traditional database systems, backups are used to recover from application or user error (also known as "oops" recovery), as well as from hardware failures or disasters. In some highly replicated cloud database systems, redundant copies of data provide local high availability and disaster recovery. As a result, such backups are often used to recover from application errors such as undesired programming, or from user errors such as mistaken user actions.

But with large volumes of data being stored in cloud systems, traditional backups come at a high storage cost, e.g., when they include a base full backup and incremental transaction log backup(s) for point in-time roll forward. A full copy of the data is maintained for the baseline backup, and another such copy is also made highly available, thus effectively doubling the total storage cost in some systems. In some cases, each of the redundant copies of the data maintained for high availability has its own baseline and its own incremental backups. In addition to the storage costs, recovering from an error takes processing time while the full backup is restored and incremental backups are applied. Substantial processing can be performed during "oops" recovery, even to allow correction of a localized error such as recovering a few rows that were deleted by mistake.

Some embodiments described herein permit a database to be queried as of an arbitrary point in time within a specified retention period. The additional storage for an as-of query is bounded by the amount of changes that have happened during the retention period. When no full baseline backup is used for the as-of query, there are substantial space savings. Moreover, the computation used for a point-in-time restore or an as-of query is bounded by the amount of data that is retrieved for the previous state and the amount of time the process is going back, thereby speeding up user error recovery.

Some embodiments use a transaction log to undo committed changes and produce previous versions of data pages. Because transaction logs are familiar as part of write-ahead logging, transaction logs that are used for as-of query and/or point-in-time recovery as taught herein are sometimes referred to here as "enhanced" logs. However, a log can be used as taught herein without necessarily being explicitly called an enhanced log. Familiar write-ahead logging may also still be done in some cases in combination with as-of query and/or point-in-time recovery.

Some embodiments provide dynamic creation of a database snapshot as of a previously passed point-in-time. Some perform on-demand page level undo and/or undoing changes in the whole database. Some embodiments impose no overhead for initial page allocation and any subsequent de-allocations, and very little overhead on transaction workload.

Some embodiments described herein may be viewed in a broader context. For instance, concepts such as databases, database pages, snapshots, queries, points in time, logging, data modification, recovery, and/or undoing modifications may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving databases, database pages, snapshots, queries, points in time, logging, data modification, recovery, or undoing modifications are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise beyond the scope of human performance alone. "Computational steps" are steps performed computationally. Neither "automatically" nor "computationally" necessarily means "immediately".

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "page(s)" means "one or more pages" or equivalently "at least one page".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as acquiring, configuring, determining, extracting, generating, handling, identifying, listing, logging, maintaining, making, mapping, modifying, performing, persisting, producing, reading, receiving, residing, responding, rewinding, scanning, specifying, traversing, undoing, using, writing (or acquires, acquired, configures, configured, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a transitory signal on a wire, for example. Unless expressly stated otherwise in a claim, a claim does not cover a signal per se. A memory or other computer-readable medium is presumed to be a storage medium unless expressly stated otherwise.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. System administrators, database administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of storage media (as opposed to media that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other memory storage devices which are not readily removable by users 104. Unless expressly stated otherwise, neither a computer-readable medium nor a computer-readable memory includes a signal per se.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other operations.

One or more logical databases 120 and database tools 122 such as queries 124, SQL and/or other query languages 126 (in the form of compilers, interpreters, user interfaces, profilers, debuggers, source code, etc.), database management system (DBMS) software 128, report generators 130, other software, and other items shown in the Figures and/or discussed in the text, may each reside partially or entirely within one or more media 112, thereby configuring those media. In addition to display(s) 148, an operating environment may also include other hardware, such as buses, power supplies, and accelerators, for instance.

In some embodiments, a given database 120 includes content 132, namely, table(s) 134, table rows 136, a database schema 138, metadata 140, system table(s) 142, storage units in the form of pages 144, transaction logs and other logs 146 containing log records 152. Content may also include zero or more database snapshots 150 which configure a memory 112 of the system 102.

Content as defined above allows a broad scope, but does not always require a broad scope. Except as expressly stated otherwise (which may occur in the specification, original claims, and/or amended claims), "content" herein refers more narrowly to user-supplied content of a database, e.g., a schema, or the data values stored in table row(s), as opposed to referring to automatically-generated content such as system tables or metadata. Likewise, although system tables are a kind of table, unless expressly stated otherwise "table" refers to a table of user-supplied content as opposed to a system table.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
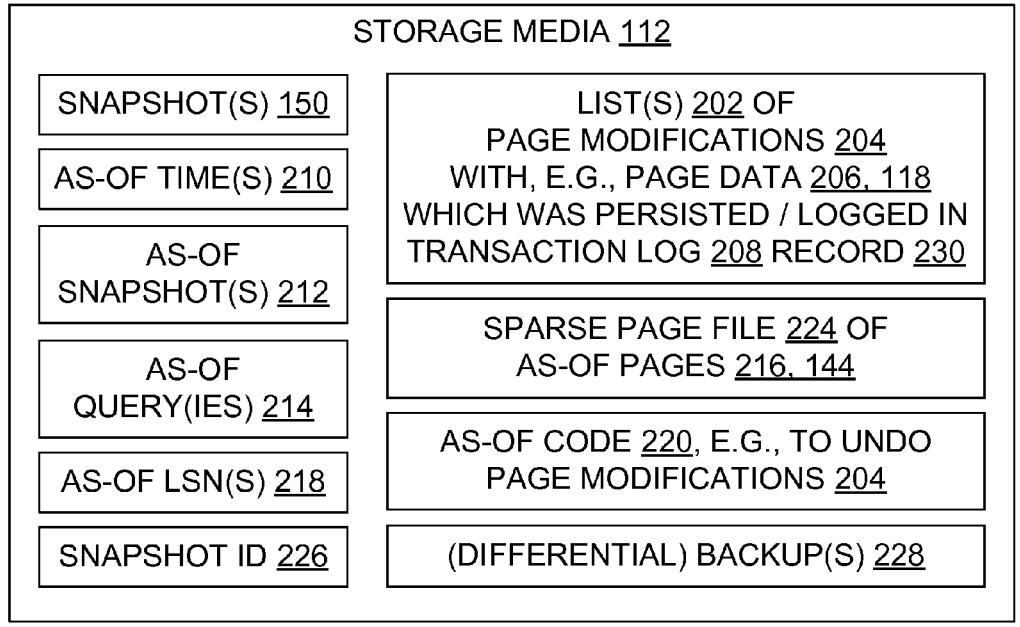
FIG. 2 is a block diagram illustrating aspects of efficient database point-in-time restore and as-of query mechanisms in an example architecture for some embodiments.

FIG. 2 illustrates an architecture which is suitable for use with some embodiments. One or more lists 202 of page modifications 204 reside in memory 112 (recall that memory 112 may be RAM, disk, and/or other memory). As used herein with respect to page modifications, "list" is used broadly to include linked lists, sequences, sets, tables, trees, graphs, collections, and other structures that contain a set of items and that are ordered (or at least susceptible to ordering) to reflect modification of page data 206 over time. Page modifications 204 include modifications (i.e., additions, deletions, changes) of page data 206 (sometimes called "page content"). Page data 206 typically includes database content 132, and may include familiar content used in memory management. Page data 206 may include familiar and/or additional page addresses, pointers, index values, handles, links, sequence numbers, and/or other page identifiers, as discussed further below and/or as shown, e.g., in FIGS. 5 and 6.

In some embodiments, one or more lists 202 of page modifications 204 are stored in a log 146, such as in enhanced records 230, 152 of a transaction log 208 or another log. Logs 146 are typically kept in the form of files, tables, and/or other structures which exist at least in part in persistent (a.k.a. non-volatile) memory. Writing to a log, whether the log is currently in RAM or in persistent memory, is referred to as "logging". Writing to a log or any other structure that is in persistent memory is referred to as "persisting". Some embodiments persist lists 202 and/or log lists 202.

Embodiments may use as-of time(s) 210 and related items in various ways. An as-of time is a time previous to the current time, for which database content 132 (in the broad or narrow sense) is sought. In a given embodiment, an as-of time 210 may be implemented as a floating point, integer, or other variable having allocated memory 112, and/or be specified in a query 124, for example.

A given embodiment may include one or more items related to an as-of time 210, in a given situation. One such item is an as-of snapshot 212, which is a snapshot 150 having content 132 as it existed at the as-of time. Each snapshot 150 is identified by a respective snapshot ID 226. Another as-of item is an as-of query 214, which is a query 124 seeking content 132 as it existed at the as-of time. Another as-of item is an as-of page 216, which is a page 144 having content 132 as it existed at the as-of time. As-of pages 216 can be generated on demand (in response to an as-of query 214) in some embodiments, and stored in a sparse page file 224 or other side file 224 in case they are needed again. Another as-of item is an as-of LSN 218, which is a log record sequence number identifying a log 208 (e.g., an enhanced transaction log record 230) having data as it existed at the as-of time. Another as-of item is as-of-code 220, which includes code executable by a processor 110 to undo at least some page modifications 204, thereby producing an as-of page 216.

Familiar backups are also present in some cases. In some environments, backups 228 include at least one full backup and zero or more subsequent differential backups. In some lexicons, differential backups are sometimes called incremental backups. In other lexicons, there are three types of backups: full backups, differential backups (containing data pages that have changed since a full backup) and log backups (containing transaction log or changes since last full or log backup). Unless otherwise indicated, reference herein to incremental backups refers to transaction log backups, not differential backups, and differential backups are called out explicitly.

With reference to FIGS. 1 and 2, some embodiments provide a computer system 102 with a logical processor 110 and a memory medium 112 configured by circuitry, firmware, and/or software to give users access to a version of database content 132 as it existed at a previous point in time, namely, a specified as-of time 210. The memory 112 is in operable communication with the logical processor 110. A database snapshot 150 resides in the memory, and thus configures the memory. The database snapshot is based on a particular database 120. A list 202 of page modifications 204 also resides in the memory, although not necessarily in the same portion or kind of memory as the snapshot. The list 202 describes, at a page 144 level, modifications 204 that were made to the database content after the as-of time.

Some embodiments also include a sparse page file 224 or other cache of an as-of snapshot 150. The sparse page file also resides in the memory 112, although as noted different items may reside in different portions of memory (e.g., on different devices) and/or reside in different kinds of memory (e.g., RAM versus hard disk).

In some embodiments, the list 202 of page modifications 204 includes one or more of the following: content of a page 144 (not necessarily the full page image) which was persisted before that page was re-used; a deleted row 136 persisted before it was moved to a newly allocated page 144; page 144 content incrementally logged before a page was re-used; a deleted row 136 incrementally logged before it was moved to a newly allocated page 144; logged full content of a page 144; an uninterrupted sequence of page modifications 204 (descriptions of changes to page content) stored in an enhanced transaction log, with at least some of the modifications logged separately from one another; incrementally logged page modifications and additional logged full page images.

Some embodiments include code 220 configuring the memory 112 and executable by the processor 110 to undo modifications at a page 144 level. For example, execution of code 220 may undo an operation on a reallocated page 144, an operation which truncated a table 134, and/or an operation which deleted a table 134. Some embodiments include code 220 to handle an as-of query 214 using an as-of page 216 that contains information (content 132) responsive to the query.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, as-of queries 214 may originate on multiple devices/systems 102 in a networked cloud, snapshots 150 may be stored on yet other devices within the cloud, and the as-of code 220 may configure the displays 148 on yet other cloud device(s)/system(s) 102.

Processes

Figure 3:
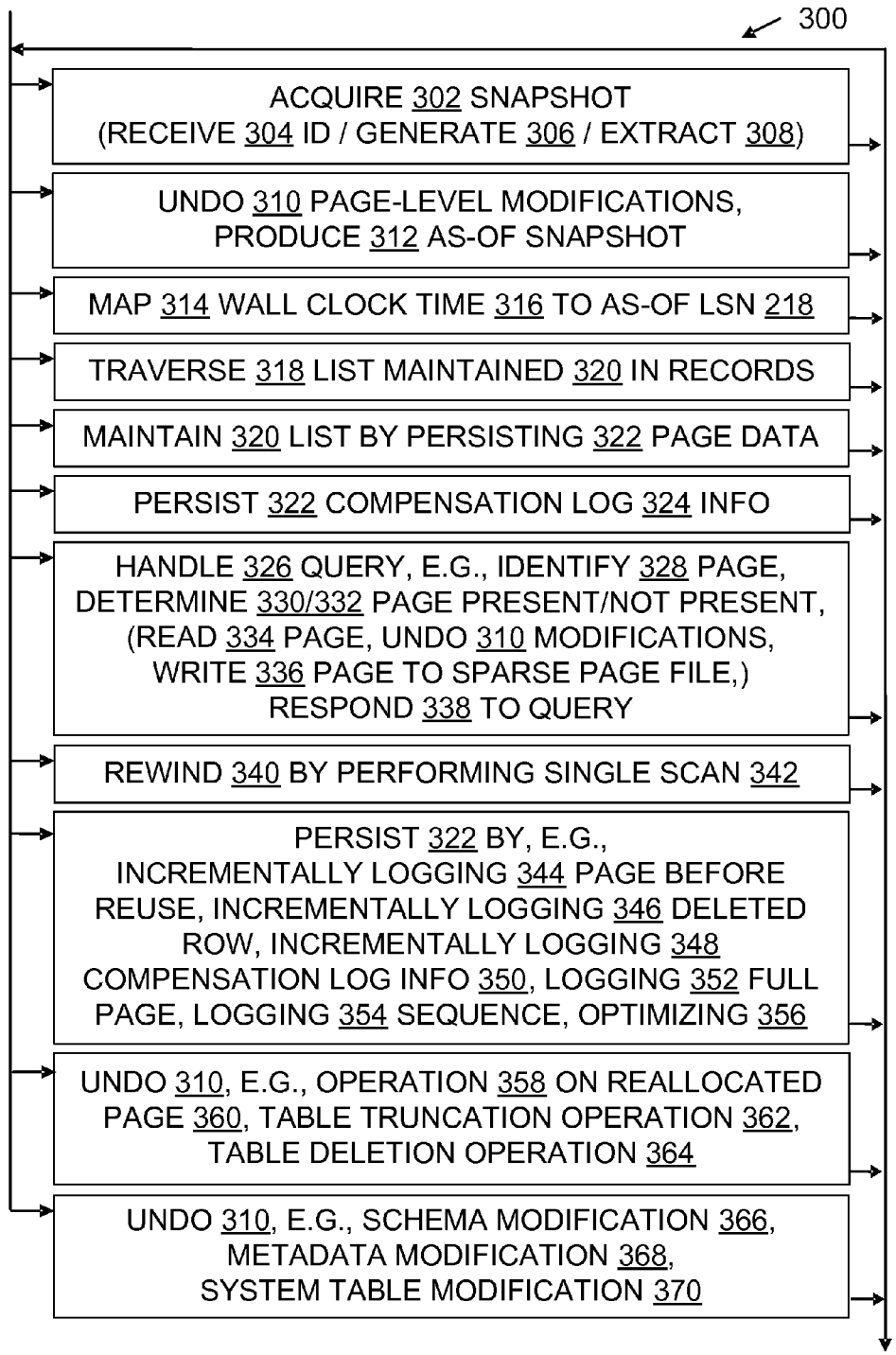
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by as-of code 220 under control of a script or otherwise requiring little or no contemporaneous user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Some embodiments provide a computational process for accessing a version of database content as it existed at a previous point in time, namely, the as-of time 210. The process includes acquiring 302 a database snapshot 150 which is based on a database 120. The database snapshot resides in and configures a computer-readable storage medium 112. In some cases, acquiring 302 the snapshot includes receiving 304 from a database user 104 through a user interface an express identification 226 of a snapshot to use as the acquired snapshot. In some, the snapshot is acquired 302 by internally (as opposed to externally from the user) automatically generating 306 a snapshot for use as the acquired snapshot. In some cases, the snapshot is acquired 302 by extracting 308 data 118 from a differential backup 228 of the database to use as the acquired snapshot.

This particular process also includes undoing 310 modifications 204 of database content which were made after the as-of time 210. The undoing step 310 is performed computationally with the acquired snapshot at a page level within the computer-readable storage medium 112. The undoing step 310 computationally produces 312 an electronically accessible as-of snapshot 212 which is a snapshot of the database in question as it existed at the as-of time.

In some embodiments of the computational process, the as-of time 210 is specified as a wall clock time, and the process includes mapping 314 from the wall clock 316 as-of time to a corresponding transaction log record 230 sequence number, namely, the as-of LSN 218. This may be accomplished, e.g., using timestamps on enhanced log records. In some embodiments, timestamps in the log records are already present, as they are used for point-in-time restore using traditional backups. Some embodiments use checkpoint records which include time to approximate a log region to search and use the individual transaction timestamps to find the exact LSN.

In some embodiments, undoing 310 modifications at a page level includes traversing 318 a list 202 of page modifications 204 that has been maintained 320 in an enhanced log 146. For example, a list 202 of page modifications may be maintained 320 in an active transaction log 208 of the database, and/or in an inactive transaction log 208 of a database backup 228.

In some embodiments, maintaining 320 a list of page modifications to support undoing page modifications may include persisting 322 page content before a page is re-used, persisting 322 deleted rows before they are moved to a newly allocated page, and/or persisting 322 compensation log 324 record undo information. Those of skill will recognize that compensation logs record the rollback of particular changes to database content, e.g., to note that a given action has been undone. Persisting step 322 may include logging data in an enhanced transaction log 208 and/or other structure.

Some embodiments of the computational process include handling 326 an as-of query 214. Handling 326 proceeds differently, depending on whether a responsive as-of page 216 already exists in usable form. Thus, in some cases the page exists, and handling 326 an as-of query 214 includes identifying 328 a page which contains information responsive to the query 214, determining 330 that the page 216 which contains information responsive to the query is present in a cache 224 of the as-of snapshot 212, and responding 338 to the as-of query using the page. In other cases, the responsive page does not exist, and handling 326 an as-of query 214 includes identifying 328 a page which contains information responsive to the query 214, determining 332 that the page which contains information responsive to the query is not yet present in a cache file of the as-of snapshot, reading 334 the page from the database, undoing 310 modifications of the page back to the as-of time to produce an as-of page 216, writing 336 the as-of page to the cache file of the as-of snapshot, and responding 338 to the query using the as-of page. Writing 336 to the sparse page file or other cache may precede, follow, or overlap responding 338 to the user. In some embodiments, the as-of query determines which page to access as of the previous time as follows. As with familiar query processing, metadata is consulted to determine where the data required by the query is stored. This metadata itself is stored in its own pages. After these pages of metadata are constructed for the as-of time, they indicate which pages contained the query-responsive data for the as-of time. Then the query processor accesses those data pages for the as-of time.

Some embodiments of the computational process rewind 340 the entire database snapshot back to the as-of time 210. Rewinding may be accomplished by performing a single scan 342 over an enhanced transaction log 208 (or other structure containing a list 202) in reverse LSN order, and undoing 310 modifications 204 to all the database pages 144 located by the scan.

In some embodiments, maintaining 320 a list of page modifications to support undoing page modifications includes one or more of the following: incrementally logging 344 page content before a page is re-used; incrementally logging 346 deleted rows before they are moved to a newly allocated page; incrementally logging 348 compensation log record undo information; logging 352 the full content of at least one page; maintaining (logging 354) an uninterrupted sequence of page modifications in a transaction log, with each modification logged separately; performing incremental logging 344/346/348 and additionally logging 352 full page images to optimize 356 undo operations.

In some embodiments, undoing 310 modifications at a page level includes at least one of the following: undoing an operation 358 on a reallocated page 360, undoing an operation 362 which truncated a table 134, undoing an operation 364 which deleted a table 134.

Some embodiments include computationally undoing 310 modifications 204, 366 of a schema 138 of the database which were made after the as-of time 210. The schema modification 366 undoing step is performed computationally with the acquired 302 snapshot 150 at a page 144 level. Some embodiments include computationally undoing 310 modifications 204, 368 of a metadata 140 value of the database which were made after the as-of time 210. The metadata modification 368 undoing step is also performed computationally with the acquired 302 snapshot 150 at a page 144 level. Similarly, some embodiments include undoing 310 modifications 204, 370 of a system table 142 of the database which were made after the as-of time 210, and the system table modification 370 undoing step is performed computationally with the acquired 302 snapshot 150 at a page 144 level.

Configured Media

Some embodiments include a configured computer-readable storage medium 112. Medium 112 may include disks (magnetic, optical, or otherwise), RAM, EEPROMS or other ROMs, and/or other configurable memory, as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as as-of code 220, as-of-snapshots 212, as-of LSNs 218, side files 224, enhanced log records 230, and/or as-of pages 216, in the form of data 118 and instructions 116, read from a removable medium 114 and/or another source such as a network connection, to form a configured medium. The configured medium 112 is capable of causing a computer system to perform process steps for transforming data through undoing 310 modifications 204 at a page 144 level as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

In some embodiments, a technological solution includes transaction log extensions to enable page level physical level undo, combined with Microsoft® SQL Server® snapshot technology and/or other snapshot functionality (marks of Microsoft Corporation). An embodiment creates a static snapshot 150 of a database by persisting pages 144 that have been modified since the snapshot creation time. The pages are persisted 322 in a side file 224 such as a sparse page file. Some embodiments allow creation of snapshots 212 as of a previous point in time. Once a snapshot 150 is created, an embodiment undoes changes to modified pages dynamically from the records 230 of the enhanced transaction log 208 at the time of page access. This approach allows the restriction of undo 310 activity to only those pages called on to run a query "as of" a specified point in time.

For page level undo, some solution embodiments chain all page modifications 204 in a single chain of transaction log records 230, with each chained entry pointing to the previous log record 230 modifying the page 144 in question. Each of the enhanced log records 230 has enough information to undo the modification to the page. In comparison to familiar ARIES based database recovery, some embodiments log additional information. For example, row deletions during page splits are logged 346, as well as undo information 350 of compensation log records. Some embodiments also log 344 the previous page image at the time of the page re-allocation. This previous page log image is called a pre-format log record in FIG. 5. Logging a page's previous image at reallocation time does not introduce any significant overhead at the initial database population time, nor at the time of page deallocation such as during table or index drops or table truncation. Some embodiments track the first time a page was allocated, in special database allocation (Page Free Space) pages.

Figure 4:
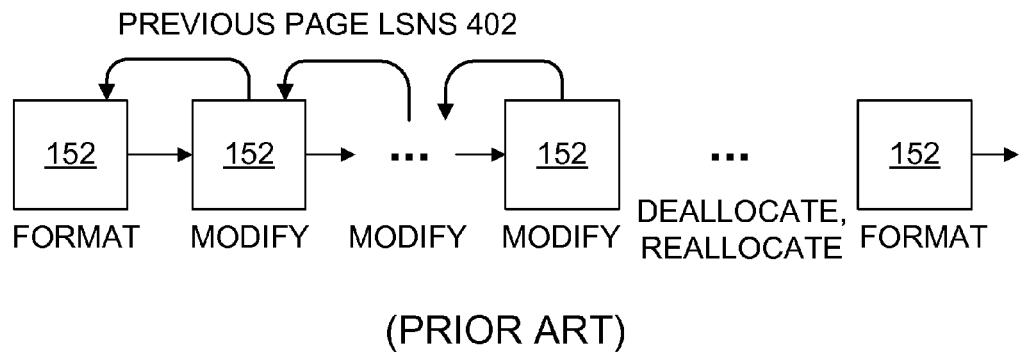
FIG. 4 is a data flow diagram illustrating a conventional database page organization and operations.
Figure 5:
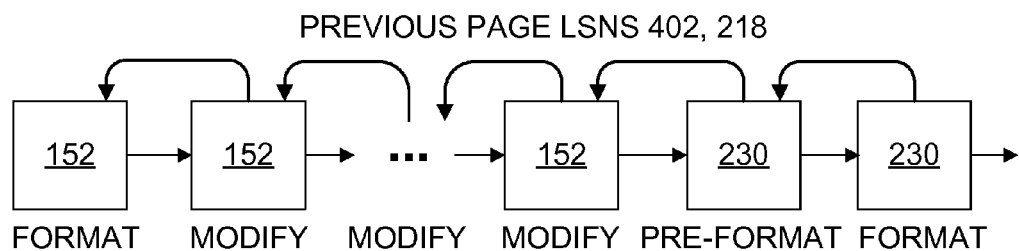
FIG. 5 is a data flow diagram illustrating database page structures and operations according to some embodiments for efficient database point-in-time restore and as-of query.
Figure 6:
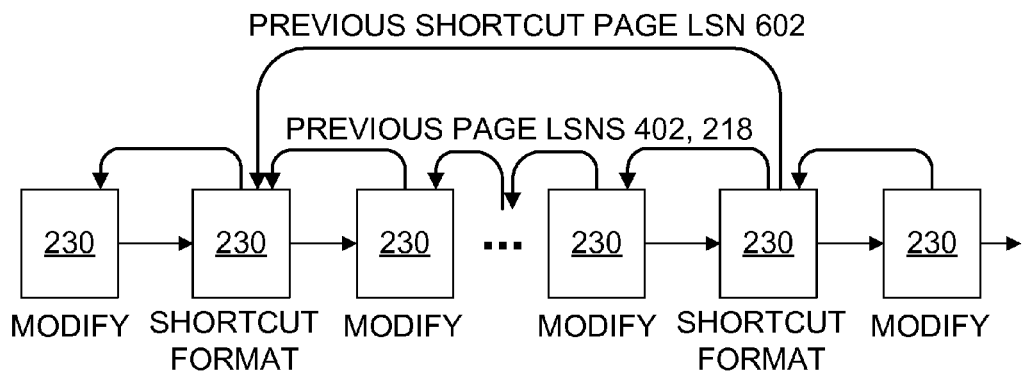
FIG. 6 is a data flow diagram illustrating a refinement of the database page structures and operations of FIG. 5 used in some embodiments that optimize an undo mechanism via shortcut pages.

The figures show page history in a transaction log before (FIG. 4) and after (FIGS. 5, 6) some solution approaches taught herein. Specifically, FIG. 4 shows a sequence of familiar transaction log records 152 and their corresponding page content and logged operations, prior to the solutions taught herein. FIG. 5 shows an example enhanced log 208; note that with some solutions taught herein page allocation does not destroy the logged history of changes made to a page. FIG. 6 shows a variation of the teachings in FIG. 5, with shortcut page images logged 352 to speed undo 310 operations.

Some embodiments manage information retention in an enhanced transaction log 208 by introducing a way to control the retention based on time units (e.g., minutes, hours, or even days). The enhanced transaction log can be truncated and reused once the undo information ages past the specified retention limit. Some embodiments extend a familiar ALTER DATABASE command syntax. Thus, a retention period is configured in some cases using a syntax like that shown below:
ALTER DATABASE SampleDB SET UNDO_INTERVAL=24 HOURS To be able to access the information as of a certain point in time, some approaches expose the database as a database snapshot 212. The user specified AsOf time (an as-of time 210) is converted (mapped 314) to an LSN (Log Sequence Number) 402 which uniquely identifies a position in a database transaction log 208. This LSN is called SplitLSN and is used as a boundary value to be checked against all pages. Once an AsOf database snapshot 212 is created, all pages on access (e.g., to respond to a query 214) have their current page LSN checked against splitLSN. All pages that have LSNs greater than splitLSN are undone 310 by following the chain of transaction log records and applying undo information one record at a time. This mechanism allows the undoing of only the pages that (a) were modified, or reallocated after a table dropped, and (b) are accessed at the time of query. All pages 144 which were undone 310 are then cached in a sparse page file 224 or other cache for future fast access. In some embodiments, sparse file content can be shared and reused by multiple snapshots created for close but different as-of times 210.

Some embodiments extend an existing CREATE DATABASE SNAPSHOT syntax with a "AS OF <datetime>" clause to specify the point in time 210 for the AS OF queries 214. Thus, in some cases an AsOf database snapshot 212 can be created with syntax similar to that shown below:
CREATE DATABASE SampleDBAsOfSnap ON (NAME=SampleDB_primary, FILENAME='d:\sampledb.ss')
AS SNAPSHOT OF SampleDB
AS OF '2011-06-05 08:26:25.473'

Certain pages 144 (mostly allocation related) receive a high ratio of updates. Undoing 310 such pages back in time may take a significant number of operations. To speed up a page undo, some embodiments periodically produce 352 a log record with a full page image having additional shortcut information 602 to jump through the page history quicker. An example of this structure is shown in FIG. 6. In some embodiments, full page images can also be extracted from differential backups that are taken periodically.

In addition to page level undo, some embodiments also allow rolling back (a.k.a. unwinding or rewinding 340) the entire database back in time by making a single sequential pass (scan 342) over an enhanced transaction log 208 backwards to the desired LSN and undoing 310 all modifications to the pages in the database. This approach may be favored when there is a large number of pages and modifications that need to be undone, and the entire database is to be restored to the specified point-in-time 210, either in-place or as a copy.

In some embodiments, a database snapshot capability in an enhanced Microsoft® SQL Server® system or other enhanced database system creates a transactionally consistent view of a database at the time a snapshot is requested (marks of Microsoft Corporation). Approaches taught herein extend the existing snapshot capabilities to create a replica as of a specified time 210 in the past, as long as the time 210 lies within the retention period covered by the list 202. In some, the primary database keeps the enhanced transaction log 208 for the retention period and the "AsOf" replica uses the enhanced transaction log 208 to undo 310 committed changes and produce previous versions of the data. In some embodiments, the undo 310 step physically undoes one data page 144 at a time independently of the other data pages in the database. This allows one to limit the undo 310 to only those pages that are accessed by the queries 214 in the lifetime of the "AsOf" replica.

In some embodiments, during the lifetime of an allocated data page modifications to the page are chained in the log 208, starting at the most recent modification and going all the way back to the format page log record 230. Page oriented undo starts with the current copy of the data page and then follows the chain of log records to undo them to produce the previous version of the page. This approach involves a continuous chain going back from the current version to the version being produced, with each of the log records along the way having enough information to undo the page. In some embodiments, the additional logging discussed herein, and the act of retaining the transaction log for the retention period, occur only after the user opts in. In other embodiments, they occur by default for a specified default retention period, which can be configured by an administrator or built-in.

In some prior approaches, when a previously de-allocated page is re-allocated the contents of the page are overwritten unconditionally by a format log record 152, as shown in FIG. 4. This breaks the chain of page log records 152 and would prevent undoing the page across a re-allocation. Some embodiments address this by using a pre-format log record 230 (FIG. 5) which logs the previous contents of the page before it is unconditionally overwritten by the format log record. In addition, some embodiments chain the pre-format log record with the new format log record so that the page now has a continuous chain of log records 230 since it was allocated. To reduce or minimize the overhead of pre-format log records, some embodiments log 344 pre-formats only if the page is re-used and only if it was ever allocated. Information as to whether a page was ever allocated is tracked in the Page Free Space (PFS) page entry of the page 144.

In order to help ensure that each log record 230 contains sufficient information to undo 310 the modifications 204, some embodiments log additional information. In some, B-Tree splits involve logging 346 the deleted rows before they are moved to the newly allocated page. Familiar compensation log records (CLRs) are redo-only, so in order to help ensure that they can be undone 310 some embodiments either log the undo information in the compensation log record itself or extract this information from the original log record that this CLR compensates.

With regard to the "AsOf" Replica, database snapshots 150 (also known as persistent replicas) are a copy-on-write replica of the primary database. In some embodiments, when the snapshot is created a point in the transaction log (SplitLSN) is chosen as the point of transactional consistency and the snapshot is recovered to undo any transactions that were active at the SplitLSN. Once creation completes, the snapshot is available as a regular read-only database. The data pages 144 that are modified since the snapshot was created are written to the copy-on-write sparse file 224 before modification. When the snapshot database retrieves the data, it reads the unchanged pages from the primary database and reads older versions from the copy-on-write file 224.

One view is that instead of rolling a log forward, one can roll the database backwards by using the enhanced transaction log 208 to unwind the database. In some cases, this eliminates reliance on a full backup, without sacrificing transactional consistency. Some embodiments allow one to thus extract good versions of corrupt data and merge them with an online database. Individual pages can be undone 310 independently, and one can reconstruct metadata, allocations, and user data. Undo 310 can be managed transparently in a DBMS storage layer, without having a query processor or metadata that understand the underlying time travel, and with no change to on-disk structures.

Some possible variations include unwinding a selected set of pages or the whole database; performing a single sequential backwards scan of the log 208; using logs 208 in backups instead of an active log; iterating an undo 310 over backup sets instead of undoing an active log; combining differential backups with a log to reduce page undo calculations; occasionally or periodically logging 352 full pages to reduce undo computations; and performing an object level restore that restores a specified set of objects to an as-of time 210.

In short, some approaches taught herein provide a space-efficient and computation-efficient AsOf query and recovery from user mistakes for write-ahead-logging-based database systems. Some approaches provided herein have reduced or minimal space and time overhead during normal transaction logging. Moreover, the undo cost is paid only at the time of recovery from a user mistake, and is bounded by the amount of information to recover.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for accessing a version of database content as it existed at a previous point in time (the "as-of time"), the process comprising the steps of:

acquiring a database snapshot based on a database;

undoing modifications of database content which were made after the as-of time, said undoing step being performed computationally in the acquired snapshot at a page level, said undoing step computationally producing an electronically accessible as-of snapshot which is a snapshot of the database as it existed at the as-of time; and handling an as-of query using a page which contains information responsive to the query, wherein the as-of query handling step comprises at least one of the following:

determining that the page which contains information responsive to the query is present in a sparse page file of the as-of snapshot;

determining that the page which contains information responsive to the query is not yet present in a sparse page file of the as-of snapshot, reading the page from the database, undoing modifications of the page back to the as-of time to produce an as-of page, and writing the as-of page to the sparse page file of the as-of snapshot; or sharing sparse file cache content among different as-of snapshots.

2. The configured medium of claim 1, wherein undoing modifications at a page level includes traversing a list of page modifications that has been maintained in at least one of the following: an active transaction log of the database, an inactive transaction log of a database backup.

3. The configured medium of claim 1, wherein the process further comprises computationally maintaining a list of page modifications to support undoing page modifications, by performing at least two of the following:

persisting page content in a transaction log before a page is re-used;

persisting deleted rows in a transaction log before they are moved to a newly allocated page; or persisting compensation log record undo information in a transaction log.

4. The configured medium of claim 1, wherein the process further comprises computationally maintaining a list of page modifications to support undoing page modifications, by performing at least two of the following:

incrementally logging page content before a page is re-used;

incrementally logging deleted rows before they are moved to a newly allocated page;

incrementally logging compensation log record undo information;

logging the full content of at least one page;

maintaining an uninterrupted sequence of page modifications in a transaction log, with each modification logged separately; or performing incremental logging, and additionally logging full page images to optimize undo operations.

5. The configured medium of claim 1, wherein undoing modifications at a page level comprises at least one of the following:

undoing an operation on a reallocated page;

undoing an operation which truncated a table; or undoing an operation which deleted a table.

6. The configured medium of claim 1, wherein the process further comprises at least one of the following:

undoing modifications of a schema of the database which were made after the as-of time, said schema modification undoing step being performed computationally with the acquired snapshot at a page level;

undoing modifications of a metadata value of the database which were made after the as-of time, said metadata modification undoing step being performed computationally with the acquired snapshot at a page level; or undoing modifications of a system table of the database which were made after the as-of time, said system table modification undoing step being performed computationally with the acquired snapshot at a page level.

7. The configured medium of claim 1, wherein the acquiring step comprises receiving from a database user an express identification of a snapshot to use as the acquired snapshot.

8. The configured medium of claim 1, wherein the acquiring step comprises at least one of the following:

internally automatically generating a snapshot for use as the acquired snapshot; or extracting data from a differential backup of the database to use as the acquired snapshot.

9. The configured medium of claim 1, in which the as-of time is specified as a wall clock time, and the process includes mapping from the wall clock as-of time to a transaction log record sequence number (the "as-of LSN").

10. The configured medium of claim 1, wherein the process further comprises maintaining a list of page modifications to support undoing page modifications, by performing at least one of the following:

persisting page content before a page is re-used; or persisting deleted rows before they are moved to a newly allocated page.

11. The configured medium of claim 1, wherein the process further comprises maintaining a list of page modifications to support undoing page modifications, by persisting compensation log record undo information.

12. The configured medium of claim 1, wherein the process comprises handling an as-of query at least in part by performing the following:

identifying a page which contains information responsive to the query;

determining that the page which contains information responsive to the query is present in a side file of the as-of snapshot; and responding to the as-of query using the page which was identified by the identifying step and which was determined by the determining step to be present in the side file.

13. The configured medium of claim 1, wherein the process comprises handling an as-of query at least in part by performing the following:

identifying a page which contains information responsive to the query;

determining that the page which contains information responsive to the query is not yet present in a side file of the as-of snapshot;

reading the page from the database;

undoing modifications of the page back to the as-of time to produce an as-of page;

writing the as-of page to the side page file of the as-of snapshot; and responding to the query using the as-of page.

14. The configured medium of claim 1, wherein the process further comprises rewinding the entire database snapshot back to the as-of time by performing a single scan over a transaction log in reverse LSN order and undoing modifications to all the database pages.

15. A computer system comprising:

at least one processor;

a memory in operable communication with the logical processor, the memory configured with data and with instructions that when executed by at least one processor causes the processor(s) to perform a process for accessing a version of database content as it existed at a previous point in time (the "as-of time"), the process comprising the steps of acquiring a database snapshot based on a database, undoing modifications of database content which were made after the as-of time, said undoing step being performed computationally in the acquired snapshot at a page level, said undoing step computationally producing an electronically accessible as-of snapshot which is a snapshot of the database as it existed at the as-of time, and handling an as-of query using a page which contains information responsive to the query, said as-of query handling comprising at least one of the following:
- determining that the page which contains information responsive to the query is present in a sparse page file of the as-of snapshot;
- determining that the page which contains information responsive to the query is not yet present in a sparse page file of the as-of snapshot,
  - reading the page from the database, undoing modifications of the page back to the as-of time to produce an as-of page, and writing the as-of page to the sparse page file of the as-of snapshot; or
- sharing sparse file cache content among different as-of snapshots;

a database snapshot residing in (and thus configuring) the memory, the database snapshot based on a database; and a list of page modifications residing in the memory and describing at a page level modifications made to the database after an as-of time.

16. The system of claim 15, wherein the system further comprises a cache file of an as-of snapshot, the cache file residing in the memory.

17. The system of claim 15, wherein the list of page modifications comprises at least two of the following:
- page content persisted before a page was re-used;
- a deleted row persisted before it was moved to a newly allocated page;
- page content incrementally logged before a page was re-used;
- a deleted row incrementally logged before it was moved to a newly allocated page;
- logged full content of a page;
- an uninterrupted sequence of page modifications in a transaction log, with at least some modifications logged separately from one another; or
- incrementally logged modifications and additional logged full page images.

18. The system of claim 15, further comprising code configuring the memory and executable by the processor(s) to undo modifications at a page level by performing at least one of the following:
- undoing an operation on a reallocated page;
- undoing an operation which truncated a table; or
- undoing an operation which deleted a table.

19. The system of claim 15, further comprising code configuring the memory and executable by the processor(s) to handle an as-of query using an as-of page which contains information responsive to the query.

20. The system of claim 15, wherein the list of page modifications comprises at least four of the following:
- page content persisted before a page was re-used;
- a deleted row persisted before it was moved to a newly allocated page;
- page content incrementally logged before a page was re-used;
- a deleted row incrementally logged before it was moved to a newly allocated page;
- logged full content of a page;
- an uninterrupted sequence of page modifications in a transaction log, with at least some modifications logged separately from one another; or
- incrementally logged modifications and additional logged full page images.

* * * * *